United States Patent [19]

Camacho et al.

[11] Patent Number: 4,698,893

[45] Date of Patent: Oct. 13, 1987

[54] ANATOMICAL HANDLE

[76] Inventors: Angel Camacho, 19, Grande'Rue, Cuffies, F-02200 Soissons; Serge Camacho, 1 rue de Laon, Crouy, F-02200 Soissons, both of France

[21] Appl. No.: 899,369
[22] PCT Filed: Sep. 25, 1985
[86] PCT No.: PCT/FR85/00261
§ 371 Date: Jul. 30, 1986
§ 102(e) Date: Jul. 30, 1986
[87] PCT Pub. No.: WO86/01979
PCT Pub. Date: Apr. 10, 1986

[30] Foreign Application Priority Data

Oct. 1, 1984 [FR] France ................................ 84 15142

[51] Int. Cl.$^4$ ...................... B23P 19/04; A47B 95/02; A01K 87/00; B29C 33/40
[52] U.S. Cl. ............................................ 29/460; 43/23; 264/222; 16/110 R
[58] Field of Search .................. 264/222, 271.1; 43/23, 43/18.1, 18.5; 29/460, 458; 16/110 R

[56] References Cited

U.S. PATENT DOCUMENTS

| 412,479 | 10/1889 | Davis | 264/271.1 |
|---|---|---|---|
| 1,931,303 | 4/1933 | Sturgis | 43/18.1 |
| 2,205,769 | 6/1940 | Sweetland | 145/61 |
| 2,711,047 | 6/1955 | Shepard | 43/25 |
| 4,502,109 | 6/1986 | Borea et al. | 16/111 R |

FOREIGN PATENT DOCUMENTS 2538590 3/1977 Fed. Rep. of Germany .
2634656 2/1978 Fed. Rep. of Germany .

OTHER PUBLICATIONS

Connaissance de la Peche, No. 75, Dec. 1984; Actualites-Information: p. 10, Nouveautes: Poignee Anatomique.

Primary Examiner—Howard N. Goldberg
Assistant Examiner—Steven Nichols
Attorney, Agent, or Firm—Armstrong, Nikaido, Marmelstein & Kubovcik

[57] ABSTRACT

Sport fishing rods such as whip rods, cast rods having a good grip adapted to each user for more efficiency and improved comfort. The process of the "do it yourself" type is comprised of a set of 5 components which are differentiated by separate bags, and which amalgamate according to a predetermined method of using and being adjusted by moulding prints on the original handle. The process may also be applied to other instruments such as shooting guns, bows, handles for ski sticks, and all personal objects requiring a cold moulding.

9 Claims, No Drawings

ANATOMICAL HANDLE

The present invention applies first of all to handles for fishing rods and more especially for sporting fishing such as whip rods, light casting rods, sea casting rods, spinning rods. Our method consists in applying directly to the handle of the rods a molding which perfectly adapts itself to the form of the hand of each user. In known devices of this kind, personalization of the handle is obtained by an artisanal process on a wooden structure worked and sanded or by an industrial process during the manufacture of the rods by hot molded plastic mass coating in succint arrangements. The main drawbacks being the heaviness and rigidity for wood, heating and perspiration for the plastic. The two solutions only providing a very questionable comfort. The anatomical handle formed essentially of cork and binder avoids these drawbacks while causing a minimum extra weight of the order of 10 to 15 grammes and providing a considerable comfort and ease of formation by any fisher, on any commercial fishing rod. The method is in the form of a ready to use kit comprising five plastic bags assembled by thermowelding, containing separately the following components: a bag of format 150 mm×150 mm, with 156.25 ml of finely crushed cork of gauge 0.03, 0.02, 0.01, i.e. 62.43% with addition of 25 ml of alginate for the imprint, of the trademark ZALGAN 2000, i.e. 9.99%, a bag of format 150 mm×100 mm with 51 ml of vinylic binder of the SADER R22 CTB G72/45 2446 type, i.e. 20.38% to which is added 18 ml of water, ie. 7.19%, a half format bag containing a finishing product which may be powdered cork, felt, flocks and two bags, of quarter format size, containing the gluing products for the molding and finishing product. The main two bags (cork+binder) are separated by a plastic clip which is removed at the time of use so as to form a single large bag so that the two products may be amalgamated by kneading. The molding is carried out as follows. With the quarter format bag provided for this purpose, glue the handle of the fishing rod intended to be equipped with an anatomical handle, then after kneading the large bag containing the amalgam for five minutes, cut a corner and spread the product obtained over any flat plastic surface over a dimension equal to the height of the handle. Chop the amalgam with any instrument so that it is not in uniform contact with the plastic surface. Take the fishing rod handle and roll it on the amalgam so that it adheres, thus a coating is obtained on the handle on which the impression of the hand is made in a way the most natural for efficient and comfortable holding. With the surplus of amalgam remaining on the plastic surface, the contour of the fingers and of the palm of the hand is formed uniformly and harmoniously, the hand is carefully withdrawn and the handle is left to dry in this condition. After drying, the finishing is carried out as follows: with the quarter format bag provided for this purpose, the anatomical handle is glued and sprinkled with the finishing product which may be more or less decorative depending on the material chosen, a single color or two colors for contrasting the relief. Such as it is formed, the anatomical handle has the following advantages: an incontestable holding comfort because of the anatomical shape, adapting itself perfectly to the morphology of each user. Thus, overheating and tetanization of the muscles is avoided in the case of intensive fishing or an extended period in the same position. Furthermore, the material used, in this case cork, insulates from cold in winter and prevents perspiration in summer. Finally, the user acquires with this method equipment personalized to his taste and to his fishing tactics. The method may be extended to other leisure and sports fields, such as handles for firearms, bows, ski sticks, javelins and vaulting poles. Finally, a very interesting application may be envisaged in the orthopedic field, in particular for people with handicapped hands and fingers who will find here a comfortable and comforting solution to all their holding problems.

We claim:

1. A method of forming the handle of a utensil, particularly for a fishing rod, a firearm, a sporting apparatus, an orthopedic apparatus, which molding is carried out under the pressure of the hand and has then the exact imprint thereof, this method being characterized in that:

the handle to receive the molding is coated with glue
   finely divided cork and binder are brought together then kneaded,
   the cork plus binder amalgam is spread over a support in a strip of a height equal to that of the molding,
   by rolling the glued handle on the amalgam the amalgam is caused to adhere till it coats the handle,
   the hand is impressed in the coating then carefully removed,
   the amalgam is left to dry.

2. The method according to claim 1, characterized in that, in addition to cork and binder, alginate is kneaded for the imprint.

3. The method according to claim 1 or 2, characterized in that before rolling the glued handle on the amalgam, by chopping, the uniform contact thereof on its support is broken.

4. The method according to claim 1 or 2, characterized in that, with the surplus of amalgam, contours are formed such as those of the fingers and of the palm of the hand.

5. The method according to claim 1 or 2, characterized in that, after drying, the amalgam is glued then sprinkled with a finishing product.

6. Means for implementing the method according to claim 1, characterized in that they comprise, more particularly, separated from each other, on the one hand, finely crushed cork to which alginate is added for the imprint and, on the other hand, a vinylic binder.

7. Means according to claim 6, characterized in that they comprise, separated from each other, on the one hand finely crushed cork of gauge 0.01 - 0.02 - 0.03 mm in a proportion by volume of 62.43% with addition of alginate for the imprint in a proportion by volume of 9.99% and, on the other hand, vinylic binder in a proportion by volume of 20.38% to which is added 7.19% by volume of water.

8. Means according to claim 6 or 7, characterized in that they comprise a sealed bag separated into two parts by a removable clip and containing, one, the finely crushed cork with alginate for the imprint and the other the vinylic binder.

9. A molding formed on a handle and adapted to the hand of the user, characterized in that it is obtained according to the method of claim 1.

* * * * *